US011576048B1

United States Patent
Bonn et al.

(10) Patent No.: US 11,576,048 B1
(45) Date of Patent: Feb. 7, 2023

(54) MITIGATING AUTHENTICATION-BASED HACKING OF ACCESS RESTRICTED TELECOMMUNICATION SERVICES

(71) Applicant: T-MOBILE INNOVATIONS LLC, Overland Park, KS (US)

(72) Inventors: Mark Bonn, Granite Bay, CA (US); Dominick Mangiardi, Fremont, CA (US); Kenneth George, Houston, TX (US); John Susbilla, Milpitas, CA (US); Abdolreza Asghari, Santa Clara, CA (US)

(73) Assignee: T-Mobile Innovations LLC, Overland Park, KS (US)

( * ) Notice: Subject to any disclaimer, the term of this patent is extended or adjusted under 35 U.S.C. 154(b) by 331 days.

(21) Appl. No.: 16/860,916

(22) Filed: Apr. 28, 2020

(51) Int. Cl.
| | |
|---|---|
| *G06F 21/56* | (2013.01) |
| *H04L 29/06* | (2006.01) |
| *H04L 29/08* | (2006.01) |
| *H04W 12/122* | (2021.01) |
| *H04L 9/40* | (2022.01) |
| *H04W 12/06* | (2021.01) |
| *H04W 8/26* | (2009.01) |
| *H04L 65/1016* | (2022.01) |
| *H04W 48/02* | (2009.01) |

(52) U.S. Cl.
CPC ....... *H04W 12/122* (2021.01); *H04L 63/1458* (2013.01); *H04L 65/1016* (2013.01); *H04W 8/26* (2013.01); *H04W 12/06* (2013.01); *H04W 48/02* (2013.01); *H04L 2463/142* (2013.01)

(58) Field of Classification Search
CPC ..... H04W 12/122; H04W 8/26; H04W 12/06; H04W 48/02; H04L 63/1458; H04L 65/1016
USPC .......................................................... 726/23
See application file for complete search history.

(56) References Cited

U.S. PATENT DOCUMENTS

| | | | |
|---|---|---|---|
| 8,787,878 B1* | 7/2014 | Malackowski | H04M 3/493 455/414.3 |
| 9,288,169 B2* | 3/2016 | Schaedler | H04L 67/306 |
| 9,781,129 B1* | 10/2017 | Bailey | H04L 63/107 |
| 9,934,081 B2* | 4/2018 | Cáliz | G06F 11/1451 |
| 10,708,776 B2* | 7/2020 | Hanley | G06Q 20/4016 |
| 11,100,245 B1* | 8/2021 | Littler | G06F 21/6218 |
| 11,301,847 B1* | 4/2022 | Chang | G06Q 20/325 |
| 2007/0238454 A1* | 10/2007 | Chambers | H04W 68/00 455/445 |

(Continued)

FOREIGN PATENT DOCUMENTS

| | | | | |
|---|---|---|---|---|
| BR | 102014015637 A2 * | 3/2016 | ......... | H04L 63/0428 |
| CA | 2701192 A1 * | 10/2010 | ......... | H04L 65/1016 |

(Continued)

*Primary Examiner* — Haresh N Patel
(74) *Attorney, Agent, or Firm* — Shook, Hardy & Bacon L.L.P.

(57) ABSTRACT

Systems and method are provided for mitigating hacking of restricted access telecommunication services. In response to an authentication response from a user device, an authentication failure type and authentication failure frequency may be determined. Based on the authentication failure type and authentication failure frequency, the user device is blocked from accessing the telecommunication service for a predetermined period of time, preventing the service from being congested by recurring unauthorized users.

20 Claims, 3 Drawing Sheets

(56) References Cited

U.S. PATENT DOCUMENTS

| | | | |
|---|---|---|---|
| 2008/0178278 A1* | 7/2008 | Grinstein | H04L 63/0227 726/12 |
| 2011/0213888 A1* | 9/2011 | Goldman | H04L 67/61 709/228 |
| 2011/0222670 A1* | 9/2011 | Sellers | H04W 76/50 379/45 |
| 2011/0258696 A1* | 10/2011 | Iyer | H04L 63/1466 726/14 |
| 2013/0022187 A1* | 1/2013 | Velusamy | H04M 3/42059 379/142.02 |
| 2014/0137178 A1* | 5/2014 | Thom | G06F 21/6218 726/17 |
| 2015/0244874 A1* | 8/2015 | Tornkvist | H04L 41/0659 370/242 |
| 2017/0111233 A1* | 4/2017 | Kokkula | H04L 43/08 |
| 2018/0359222 A1* | 12/2018 | Hathaway | H04L 9/0825 |
| 2019/0327253 A1* | 10/2019 | Manadhata | G06F 21/554 |
| 2020/0251118 A1* | 8/2020 | Sunkavally | G10L 17/04 |

FOREIGN PATENT DOCUMENTS

| | | | | |
|---|---|---|---|---|
| CN | 102035800 A | * | 4/2011 | |
| CN | 107872588 A | * | 4/2018 | H04M 3/2281 |
| CN | 106375472 B | * | 9/2019 | H04L 67/32 |
| WO | WO-2013079115 A1 | * | 6/2013 | H04L 65/1016 |
| WO | WO-2016112792 A1 | * | 7/2016 | |
| WO | WO-2018229602 A1 | * | 12/2018 | H04W 48/02 |

\* cited by examiner

US 11,576,048 B1

MITIGATING AUTHENTICATION-BASED HACKING OF ACCESS RESTRICTED TELECOMMUNICATION SERVICES

The present disclosure is directed, in part, to mitigating authentication-based hacking of access restricted telecommunication services, substantially as shown in and/or described in connection with at least one of the figures, and as set forth more completely in the claims.

In aspects set forth herein, one or more hacking mitigation protocols takes place in response to determinations or observations of requests or attempts from one or more unauthorized user devices to access a restricted telecommunication service. Generally, telecommunication networks, including wireless telecommunication networks and the public switched telephone network (PSTN) allow users to access restricted telecommunication services, such as the Government Emergency Telecommunications Service (GETS) or the Wireless Priority Service (WPS), for example. Access restricted telecommunication services may exist for any number of reasons; in the case of emergency services such as GETS and WEPS, restricted services may exist in order to prioritize the connections of first responders, command centers, emergency managers, and the like, in order to facilitate and ensure effective communication between emergency personnel in times of network congestion or disruption. Unfortunately, many access restricted telecommunication services have known vulnerabilities that may compromise their availability in times of critical need.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

Figure 1:
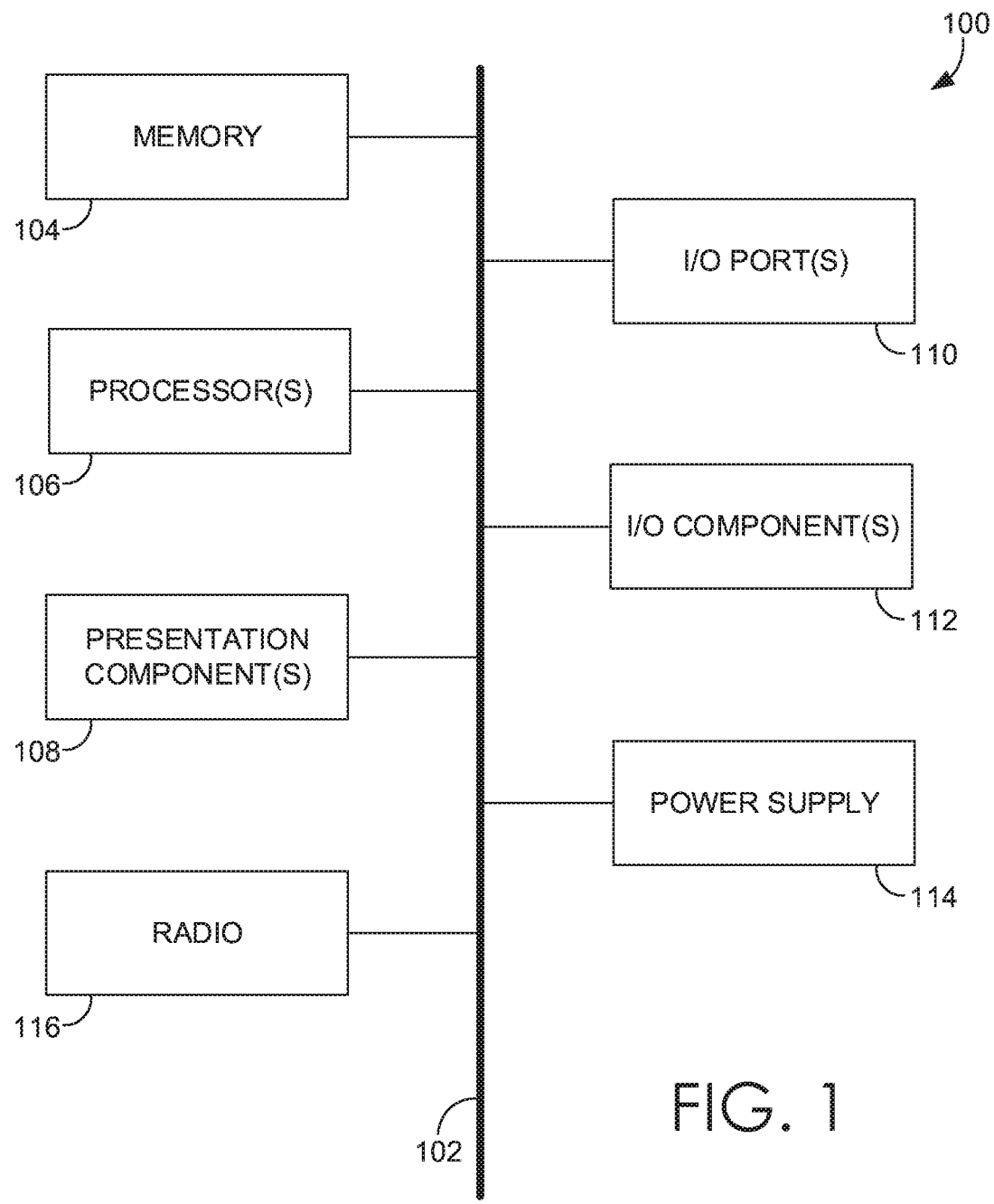
FIG. 1 is a diagram of a computing environment suitable for use in implementations of the present disclosure.

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
CD-ROM Compact Disk Read Only Memory
CDMA Code Division Multiple Access
eNodeB Evolved Node B
GIS Geographic/Geographical/Geospatial Information System
gNodeB Next Generation Node B
GETS Government Emergency Telecommunication Service
CPRS General Packet Radio Service
GSM Global System for Mobile communications
DVD Digital Versatile Discs
EEPROM Electrically Erasable Programmable Read Only Memory
LEI) Light Emitting Diode
LTE Long Term Evolution
MIMO Multiple Input Multiple Output
PC Personal Computer
PCS Personal Communications Service
PDA Personal Digital Assistant
PIN Personal Identification Number
RAM Random Access Memory
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator.
SINR Transmission-to-Interference-Plus-Noise Ratio
SIP Session Initiation Protocol
SNR Transmission-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable with UE)
WPS Wireless Priority Service Further, various technical terms are used throughout this description. An illustrative resource that fleshes out various aspects of these terms can be found in Newton's Telecom Dictionary, 31st Edition (2018).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, telecommunication networks, whether a wireless network, the public switched telephone network, or combinations thereof may provide access for a user (e.g., utilizing a landline telephone) or a user device (e.g., a UE) to access one or more telecommunication services. In some cases, the desired telecommunication service may provide a particular type of service to the user or the user device. The desired telecommunication service may, as a result of providing the particular service, restrict access so that only some users or user devices may utilize the service. In some aspects, the desired telecommunication service may be an emergency communication service (e.g., GETS, WPS, e911, and the like) that allow validly-accessing users or user devices to have a higher-priority to limited telecommunication services. Such services are particularly valuable during periods of severe network congestion or disruption, when new, high priority emergency, connections are permitted to connect before non-emergent connections. In order to preserve the value of the emergency service, many services are access restricted. For example, access to WPS is restricted to a limited number of wireless devices; when a user device attempts to dial into the WPS, one or more components of the network will determine, by comparing a unique device identifier to a directory of authorized user devices, Whether the user device is authorized. In another example, access to GETS is restricted to those who can validly authenticate their access. Specifically, GETS is accessed by a user dialing an access number and then, when prompted, entering a PIN. If a valid PIN is entered, the user is prompted to enter a destination number and the resultant connection is prioritized over non-emergency traffic in the connection queue.

Unfortunately, like many modern networks, access-restricted telecommunication services are often targeted, whether inadvertently or deliberately, by actions that could compromise their intended purpose. For example, a user could misdial a number or dial a service access number without understanding the requirements for access, or a had actor could launch a coordinated and deliberate attack on the service in order to deny or degrade valid service usage. Regardless of intent, unauthorized attempts to connect to the restricted service have the effect of busying the service and preventing the service from serving valid traffic. In authentication-based services, such as GETS, unauthorized attempts may be manifested by a failure to enter a PIN, the entry of an improper or invalid PIN, or by exceeding entry time requirements.

Accordingly, a first aspect of the present disclosure is directed to a system for mitigating impacts on restricted telecommunication services, the system comprising a node, wherein the node is configured to wirelessly communicate with a user device in a geographic area. The system may also comprise one or more processor configured to perform operations comprising receiving a plurality of access requests to access a restricted telecommunication service from the user device. The operations further comprise prompting the user device to enter an authentication code in response to each access request of the plurality of access requests. The operations further comprise determining, based on a plurality of authentication responses from the user device, that the user device is attempting to hack the restricted telecommunication service, each of the plurality of authentication responses being a response to each of access request of the plurality of access requests. The operations further comprise implementing, based on the determination, one or more hacking mitigation protocols, the one or more hacking mitigation protocols modifying the ability of the user device to access the restricted telecommunication service.

A second aspect of the present disclosure is directed to a method for managing transmission of one or more synchronization signals in a wireless network. The method comprises receiving at a media resource function of an IMS core, a request from a user device to access a government emergency telecommunication service. The method further comprises prompting, by the media resource function, the user device for an authentication PIN. The method further comprises receiving, from the user device, an authentication response. The method further comprises determining an authentication failure type based of the authentication response. The method further comprises determining an authentication failure frequency of the user device. The method further comprises determining, by an application service of the IMS core, a hacking category of the user device based on the authentication failure type and the authentication failure. The method further comprises communicating an instruction from the application service to a proxy call session control function of the IMS core. The method further comprises blocking, by the proxy call session control function the user device from accessing the media resource function of the IMS core for a predetermined time period.

According to another aspect of the technology described herein, a non-transitory computer readable media, having instructions stored thereon, that, when executed by one or more processors, cause the one or more processors to carry out a method for mitigating hacking of a restricted telecommunication service. The method comprises receiving a plurality of authentication responses within a predetermined time period from one or more user devices attempting to access the restricted telecommunication service, wherein each user device of the one or more user devices fails to authenticate access to the restricted telecommunication service. The method further comprises determining, based on an authentication failure type of each of the plurality of authentication responses, that the one or more user devices is engaged in a denial of service attack against the restricted telecommunication service. The method further comprises determining a unique device identifier for each user device of the one or more user devices. The method further comprises blocking subsequent attempts by the one or more user devices to access the restricted telecommunication service for a predetermined time period Referring to FIG. 1, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, WCD, or other user device, capable of two-way wireless communications with an access point. Some non-limiting examples of the computing device 100 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents What may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RE, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or 110 components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

Radio 116 represents a radio that facilitates communication with a wireless telecommunications network. In aspects, the radio 116 utilizes one or more transmitters, receivers, and antennas to communicate with the wireless telecommunications network on a first downlink/uplink channel. Though only one radio is depicted in FIG. 1, it is expressly conceived that the computing device 100 may have more than one radio, and/or more than one transmitter, receiver, and antenna for the purposes of communicating with the wireless telecommunications network on multiple discrete downlink/uplink channels, at one or more wireless nodes. Illustrative wireless telecommunications technologies include CDMA, GPRS, TDMA, GSM, and the like. Radio 116 might additionally or alternatively facilitate other types of wireless communications including WiMAX, LTE, or other VoIP communications. As can be appreciated, in various embodiments, radio 116 can be configured to support multiple technologies and/or multiple radios can be utilized to support multiple technologies. A wireless telecommunications network might include an array of devices, which are not shown so as to not obscure more relevant, aspects of the invention. Components such as a base station, a communications tower, or even access points (as well as other components) can provide wireless connectivity in some embodiments.

Figure 2:
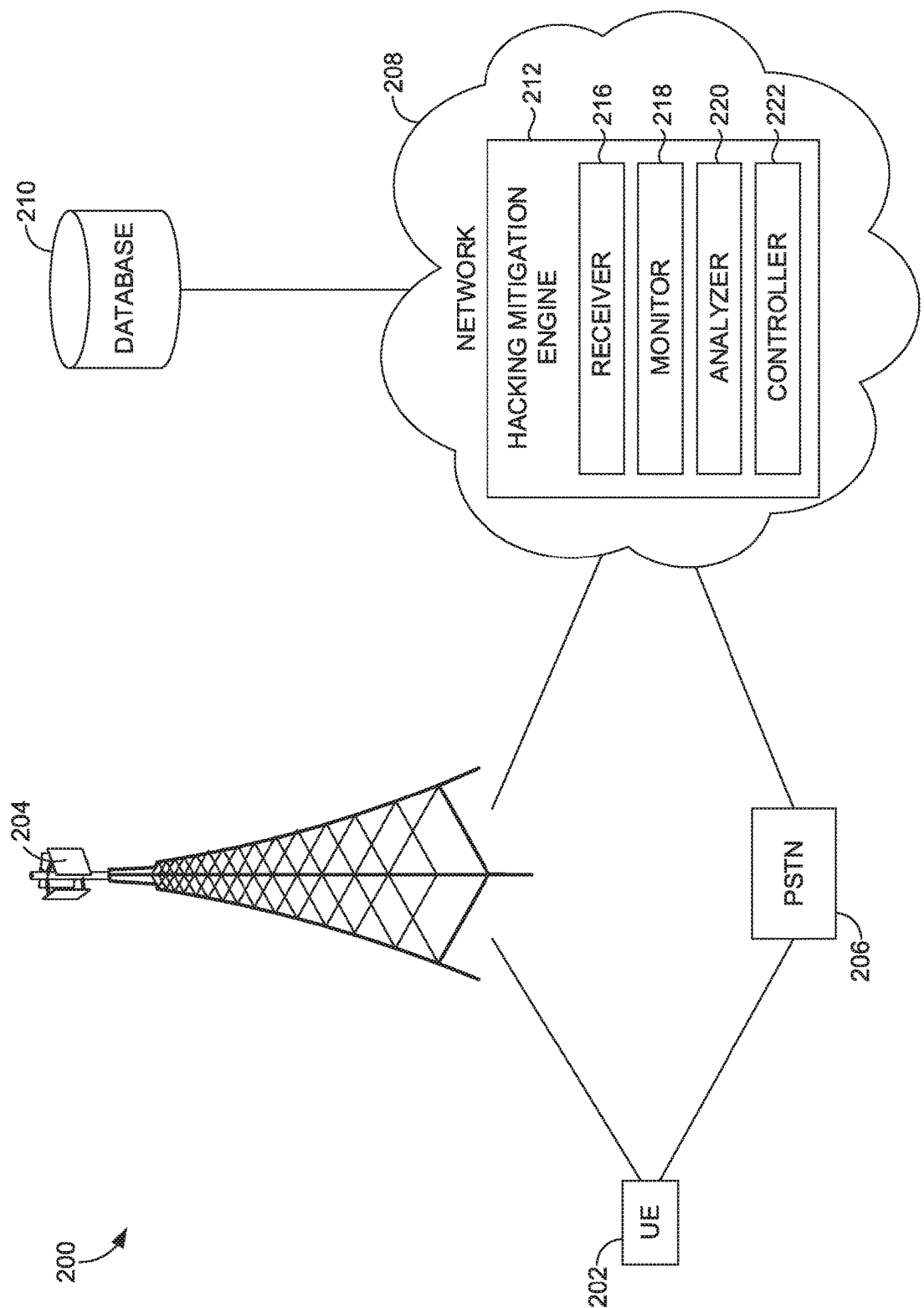
FIG. 2 illustrates a network environment in which implementations of the present disclosure may be employed.

FIG. 2 provides an exemplary network environment in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 includes user device 202, a node 204, network 208, database 210, and hacking mitigation engine 212. In network environment 200, the user device 202 may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 100) that wirelessly communicates with a node of the wireless network, such as the node 204, in order to interact with one or more components of the network 208. In other aspects, the user device 202 may be a landline telephone, in which case, the network environment 200 may not include the node 204; instead, the user device 202 may be communicate with the network 208 via a PSTN or other suitable telephone network. The user device 202 may be said to have a unique identifier, used to exclusively identify the user device (e.g., an Automatic Number Identifier (ANT) when it attempts to or actually connects to the one or more components of the network 208.

In some aspects, the user device 202 can correspond to computing device 100 in FIG. 1. Thus, a user device can include, for example, a display(s), a power source(s) (e.g., a battery), a data store(s), a speaker(s), memory, a buffer(s), a radio(s) and the like. In some implementations, the user device 202 comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network. Further, the user device 202 may communicate with the node 204 on any one or more frequencies, frequency bands, channels, or the like. Though only the node 204 is depicted in FIG. 2, it should be understood that the user device 202 may be capable of connecting to any one or more of a plurality of nodes, using any one or more of a plurality of communication protocols, on any one or more of a plurality of frequencies.

In some cases, the user device 202 in network environment 200 can optionally utilize network 208 to communicate with other computing devices (e.g., a mobile device(s), a server(s), a personal computer(s), etc.) through the node 204. The network 208 may be a telecommunications network(s), or a portion thereof. A telecommunications network might include an array of devices or components (e.g., one or more base stations, servers, computer processing components), some of which are not shown. Those devices or components may form network environments similar what is shown in FIG. 2, and may also perform methods in accordance with the present disclosure. Components such as terminals, links, and nodes (as well as other components) can provide connectivity in various implementations. Network 208 can include multiple networks, as well as being a network of networks, but is shown in more simple form so as to not obscure other aspects of the present disclosure. For example, the network 208 may comprise a core network, which may further be said to comprise one or more components of a transport layer, control layer, and/or application layer. The network 208 may alternatively comprise an Internet Protocol Multimedia Service (IMS) core. The network 208 may comprise any one or more components, subcomponents, processors, engines, or the like, which perform functions for establishing a connection between the user device 202 and a destination. In aspects, the network 208 may comprise a Media Resource Function (MRF), which may be configured to receive a request or other indication from the user device 202 that the user device 202 is attempting to access a particular service and, in response to such a request, reply to the user device 202 with a prompt for additional information. The network 208 may comprise a call session control function (CSCF), such as a Proxy-CSCF (P-CSCF), which, when configured at or near the edge of the EMS core or network 208, handle Session Initial Protocol SIP signaling packets (e.g., SIP INVITE). Further, the network 208 may be said to comprise one or more application servers, which provide access to an application or service requested by the user device 202.

In aspects, the network 208 may comprise one or more components of a radio access network (RAN). In said aspects, the RAN can be part of a telecommunication network that connects subscribers to their immediate service provider or one or more core networks. For example, the RAN can be associated with a telecommunications provider that provides services (e.g., voice, data, SMS) to user devices, such as user device 202. For example, network 208 may provide voice, SMS, and/or data services to user devices or corresponding users that are registered or subscribed to utilize the services provided by a telecommunications provider. Accordingly, the network 208 may comprise any one or more communication networks providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), a 5G network, or a PSTN.

In some implementations, the node 204 is configured to communicate with user devices, such as the user device 202 that are located within the geographical area, or cell, covered by the one or more antennas of the node 204. Said area may be referred to herein as a geographic coverage area, sector, or the like. Though referred to as a node for simplicity, the node 204 may include (or be communicatively coupled to) one or more base stations, nodes, base transmitter stations, radios, antennas, antenna arrays, power amplifiers, transmitters/receivers, digital signal processors, control electronics, GPS equipment, and the like. In particular, the node 204 may receive a variety of uplink signals from the user device 202 that include requests to access a particular application, service, object, or the like (e.g., an access-restricted telecommunication service). With respect to wired configurations, the PSTN 206 may provide a wired connection between the user device 202 and the network 208. Whether communicated by the node 204 or the PSTN 206, the network environment 200 exists to facilitate the establishment and maintenance of a connection between the user device 202 and the network 208.

The network 208 may comprise or be communicatively coupled to one or more components that, together, may be said to comprise a hacking mitigation engine 212 that is utilized, in various implementations, to perform one or methods for mitigating hacking of or disruptions to a restricted access telecommunications service. The hacking mitigation engine 212 may be said to comprise any one or more of an receiver 216, a monitor 218, an analyzer 220, and a controller 222. However, in other implementations, more or less components than those shown in FIG. 2 may be utilized to carry out aspects of the invention described herein. Though shown as within the network 208, the hacking mitigation engine 212 or any of its components or subcomponents may take the form of one or more software stacks, modules, applications, etc., may be executed and/or located at a single location or a plurality of locations, and may executed by one or more network components, or may provide instructions for execution at a location remote to the beam sweeping management engine. As a whole, the hacking mitigation engine 212 operates to receive requests or attempts from the user device 202 to access a restricted service, prompt for authentication, determine, based on the user device's authentication response(s) that the user device is not authorized to access the restricted service, and execute one or more hacking mitigation protocols to prevent the restricted service from being congested or disrupted by illegitimate traffic.

The receiver 216 of the hacking mitigation engine 212 is generally responsible for receiving information and/or indications from various network components and/or user devices that may be relevant for making hacking mitigation decisions. The receiver 216 may receive an indication that the user device 202 has requested access to, or attempted to access, a restricted service (e.g., the user device 202 dialed an access number associated with the restricted service, the user device 202 dialed a prefix, suffix, or used a local application associated with a request for access to the restricted service, or the like). The receiver 216 may receive an indication of a unique identifier associated with the user device (e.g., an automatic number identification (ANI)). In aspects Where the use device 202 utilizes a wireless connection to access the network 208, the ANI may be obtained from one or more SIP packets. The receiver 216 may receive one or more indications of a position of a user device, such as the user device 202. The one or more indications of the position of the user device may comprise at least one of a geographic coordinate (i.e., geo-coordinate) and a time that the user device 202 was located at the geographic coordinate. The geographic coordinate may be based on any desirable methodology; for example, the geographic coordinate may be based on or provided by an extra-terrestrial or terrestrial navigation system (e.g., GPS, GLONASS, LORAN, and the like), or it may be based on one or more determinations made by any one or more components of the user device 202, node 204, or network 208, based on information available to them (e.g., network-based location services, triangulation, lines of bearing to a node, time delay location, and the like). The receiver 216 may receive user device position information directly from the user device, or indirectly, via one or more network components 208. The receiver 216 may communicate the access request, unique device identifier, and/or position information of the user device 202 and any/all other user devices within a desirable geographic area to one or more of the monitor 218, the analyzer 220, or the controller 222.

The monitor 218 of the hacking mitigation engine 212 is generally responsible for compiling the one or more indications received by the receiver 216 from the user device 202. The monitor 216 may append the one or more received indications with a time entry, in order to compile a series of interactions between the user device 202 and the network 208 over a predetermined period of time that are relevant to the restricted service. For example, the monitor 216 may compile and log a series of interactions (e.g., 3, 5, 10, 100, etc.) associated with the user device 202 attempting to access the same restricted service within the predetermined time (e.g., 1, 5, 10, 15, or 60 minutes, or the like). Further the monitor 218 may be configured to track and compile a log comprising a plurality of access requests by a plurality of user devices, wherein each of the plurality of user devices is located within a predetermined radius. For example, the monitor 218 may create a log a number of access requests (5, 10, 50, 100, 1000, etc.) by a number of devices (e.g., 2, 5, 10, 100, etc.) within a radius of one another (e.g., 0.1, 1, 5, 10, or 25 miles, etc.). The monitor 218 is configured to provide all or a portion of the monitored indications or compilations of indications to the analyzer 220, the controller 222, or any other component, subcomponent, processor, or software stack of the network 208.

The analyzer 220 is generally responsible for determining whether a hacking event is occurring, determining a hacking mitigation protocol, and communicating the hacking mitigation protocol to the controller 222. As briefly discussed above, some access restricted telecommunication services utilize an authentication code in order to vet the user or the user device's permissions to access the service. The analyzer 220 may evaluate the information provided by the receiver 216 and/or the monitor 218 in order to determine why one or more user devices attempted or requested access to a restricted service but were not granted access. In authentication-vetted services, the failed attempt may be the result of a failure to enter the authentication code, entry of an incorrect authorization code, entry of an improperly formatted authorization code (too few or too many digits, using digits that are not valid entries, etc.), or failure to comply with timing requirements of the authentication entry. The analyzer 220 may evaluate how many failed attempts occurred within a predetermined time, and/or what type of authentication failure occurred in order to determine a hacking mitigation protocol that is appropriate for the situation. For example, failure to comply with timing requirements may be manifested by a user's failure to enter subsequent digits within a certain time of the last entered digit. If a user device entered a code too slowly, entered an incorrect number, and the unsuccessful attempt from the particular ANI occurred within 5 minutes of similarly failed access attempt, the analyzer 220 may determine that the user device is simply having difficulties with entering the access code (as opposed to being a hostile actor). If, on the other hand, the analyzer 220 determines that a user device has attempted to access the restricted service numerous times in a short time frame and repeatedly fails to authenticate in a similar manner (e.g., every time no PIN is entered, every time the time between digit entries is too fast, etc.), the analyzer 220 may determine that the originating user device is hostile and that a hacking mitigation protocol may include blocking all requests or attempts of the ANI associated with the user device to connect to the restricted service. Finally, the analyzer 220 may communicate the hacking mitigation protocol to the controller 222, wherein the controller implements the protocol by providing one or more blocking or filtering instructions to one or more components of the network 208.

An example of the network environment 200 illustrates how the components and functions described herein work cooperatively to reduce the impact on restricted telecommunication services. In the United States, the Department of Homeland Security is responsible for operating GETS. The GETS platform is accessed by user devices dialing a toll free number or a direct access number. The GETS platform exists to prioritize emergency communications during times of high congestion or disruption in the landline telecommunications network that makes up the backbone of the American telephone system. To preserve the ability of high priority callers to utilize the system, the GETS platform requires a PIN in order to authenticate the user's access to the restricted service. In terms of the network environment 200, the user device 202 may initiate a GETS request by calling the GETS toll free number. Assuming the user device 202 is wirelessly connected to a telecommunication network, the request is sent from the user device 202 to the node 204, where it is forwarded through the RAN and to IMS Core. In the absence of the present solution, the IMS Core will respond to the access request by prompting a PIN from the user device 202. Any resources used by the IMS core would be wasted if the user device was a hostile actor, preventing legitimate user devices from attaining their deserved higher priority.

Embodiments of the present disclosure utilize the hacking mitigation engine to perform a method that would reduce or limit exposure to the IMS core and increase the likelihood that desired high priority functionality is preserved. The present solution may utilize the receiver 216, which make take the form of a Media. Resource Function (MRF), to receive the access request from the user device 202. The MRF may respond to the access request with an authentication request, prompting the user device to provide an authentication code. Based on the authentication response from the user device 202, the MRF may determine that the user device 202 does not have access to the GETS platform. The authentication failure could be of any one or more of various authentication failure types; for example, no PIN (the user device 202 does not respond to the authentication request), improper PIN (the user device enters the wrong number of digits or digits/characters that are not valid), incorrect PIN (the user device uses the correct number of valid digits but the PIN is incorrect), invalid. PIN timing (the user device enters the entire PIN too fast or too slow, or the time between entering each subsequent PIN digit is too fast or too slow), or other similar types or combinations of PIN failures. Whether the MRF or a separate component compares GETS access requests with GETS access grants, the monitor 218 tracks information provided by the user device 202 during the access request process; that information may comprise the ANI of the user device, location of the user device, authentication failure type, and time of authentication failure.

Based on any combination of authentication failure type, authentication failure frequency, and location or requesting user device, the analyzer 220 (e.g., a GETS Application Service (AS)) may determine a category of the user device (e.g., unauthorized, persistent, or hostile). In one aspect, a specific user device, such as user device 202 may attempt to access the GETS platform. If the user device 202 fails to authenticate with the MRF because it does not enter a PIN (i.e., no PIN authentication failure type), and not subsequent request is attempted within a predetermined period of time (e.g., 30 minutes or more), the analyzer 220 may determine that the user device 202 dialed an incorrect number or was otherwise not attempting to compromise the service. In such an exemplary aspect, the analyzer 220 may categorize the user device 202 as category type "unauthorized" and take no action. If the user device 202 had an authentication type of no PIN (or improper PIN) and frequently attempted to access the service (e.g., several times per minute, once per minute, etc.), the analyzer 220 may determine that the operator of the user device 202 is aware they are accessing a restricted service and is making no effort to authenticate. In such an aspect, the analyzer 220 (e.g., the GETS AS) may categorize the user device 202 as "hostile" and instruct the controller 222 (e.g., a P-CSCF within the same IMS core) to block all GETS access number attempts by the user device 202 for a predetermined amount of time (e.g., 5 minutes, 30 minutes, an hour, a day, a week, etc.) by setting a time to live (TTL) block on the originating ANI, such that the hostile threat mitigation protocol is more restrictive than a mitigation protocol used against an unauthorized user device or a persistent user device. TTL's may be self-expiring based on the criteria and then the service is normalized upon expiration. Because the blocking would only be for the GETS access number for that specific ANI, all other calling attempt from that ANI into the IMS core would not be impacted.

In another aspect, if the user device 202 enters an invalid PIN or has invalid PIN timing, the analyzer 220 may determine that the user device 202 is having difficulty entering the PIN (e.g., due to high stress of the operator) and allow the user device 202 to make several attempts before categorizing the user device 202 as "persistent" and implementing a hacking mitigation protocol. For persistent user devices, the analyzer 220 may determine that the hacking mitigation protocol should be short in duration, striking a balance between inadvertently blocking authorized users who are entering the PIN incorrectly and mitigating service congestion. If a persistent user device continues to have authentication failures, it may be escalated to a "hostile" device. For persistent user devices, the analyzer 220 may further consider the location of the user device. If the user device is located within a designated emergency area (e.g., a county having a natural or manmade disaster, a region that has lost power, etc.), the analyzer 220 may dynamically increase or decrease the thresholds for triggering a hacking mitigation protocol or may modify the mitigation protocol itself. For example, if the user device is located in proximity to a tornado event, the analyzer 220 may allow for the reality that the operator of the user device is under increased duress and increase the allowance of authentication failures before triggering a hacking mitigation protocol against the user device, decrease the TTL of the ANI block, or both.

In yet another aspect, the analyzer 220 may determine that the user device 202 is undertaking, or is part of a larger denial of service (DOS) or distributed DOS (dDOS) attack. In response to determining that a DOS or dDOS attack is occurring, the analyzer 220 may assign any associated user device 202 as hostile and trigger a lengthy TTL of the ANI block. The analyzer 220 may determine that such an attack is occurring based on the user device 202 having a particular authentication failure type (no PIN, improper PIN, or invalid PIN timing (e.g., time between subsequent digits is faster than a predetermined frequency, such as one or two digits per second, one digit per second, etc.)) and a high authentication failure frequency (e.g., more than once per minute). In another aspect, the analyzer 220 may consider the location of the user device 202. For example, if several ANIs form a set of ANI that are attempting to access the same restricted service on the same IMS core (or the location of each of the set of ANIs is within a predetermined radius (e.g., 1, 5, 10, 25 miles) and each ANI of the set of ANIs has a same or similar authentication failure type or authentication failure frequency, the analyzer 220 may determine that the set of ANIs are a hostile set, and trigger a hacking mitigation protocol with a high TTL of the ANI block for each of the ANIs of the set of ANIs. In yet another aspect, if the user device 202 is a member of the hostile set of ANIs that have been determined to be engaged in a DOS or dDOS attack, the analyzer 220 may instruct the controller 222 to execute a lifetime block on the originating ANI, vis-à-vis the restricted service.

Figure 3:
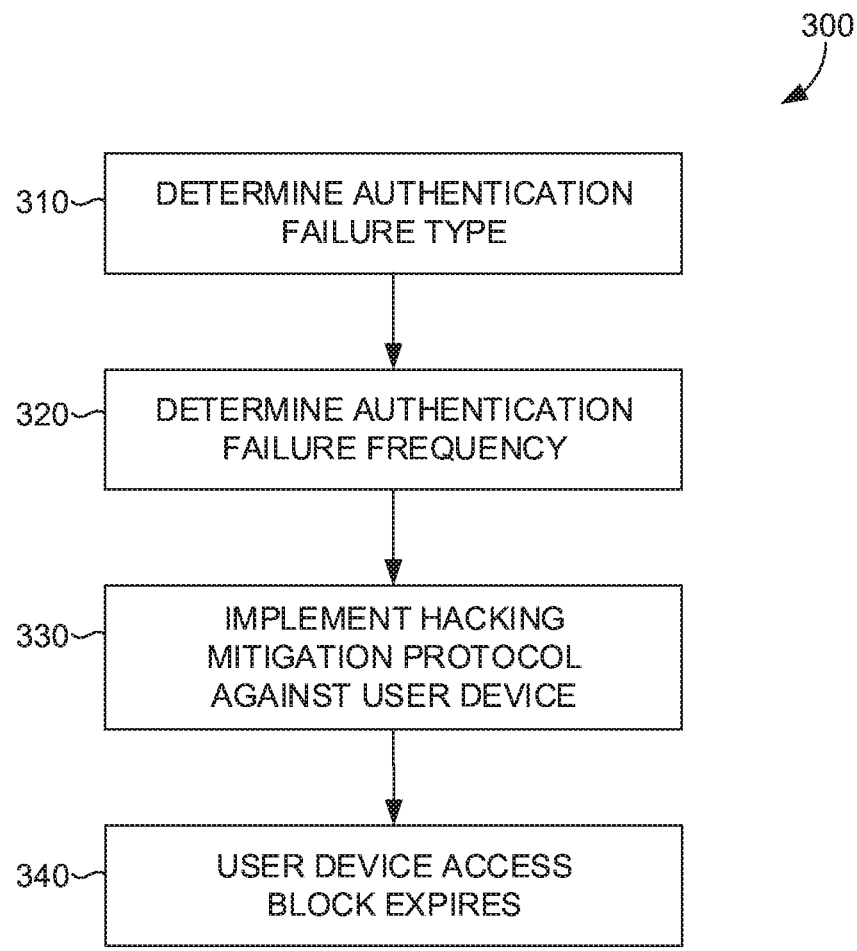
FIG. 3 is a flow diagram of one aspect of a method for mitigating authentication-based hacking of an access restricted telecommunication service, in accordance with implementations of the present disclosure.

FIG. 3 depicts a flow diagram of an exemplary method 300 for mitigating hacking of an access-restricted telecommunication service. At step 310, an authentication failure type is determined. Said authentication failure type may be based on an input or response from a user device comprising an authentication code (e.g., a PIN), substantially as described with respect to one or more components of FIG. 2. The method 300 may proceed to step 320 and determine an authentication failure frequency associated with a user device having a unique device identifier, substantially as described with respect to one or more components of FIG. 2. At step 330, a hacking mitigation protocol is implemented against the user device, as described in accordance with any one or more aspects of FIG. 2. The hacking mitigation protocol may comprise a block against attempts by the user device to access the restricted service. The block may further comprise a TTL. At step 340 the user device has the access block lifted at the expiration of the TTL, allowing the user device to access the restricted service upon satisfactory authentication.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A method for mitigating hacking of a restricted telecommunication service, the method comprising:
receiving at a media resource function of an IMS core, a request from a user device to access a government emergency telecommunication service;
in response to receiving the request, prompting, by the media resource function, the user device for an authentication PIN;
receiving, from the user device, an authentication response;
determining an authentication failure type based of the authentication response;
determining an authentication failure frequency of the user device;
determining, by an application service of the IMS core, a hacking category of the user device based on the authentication failure type and the authentication failure;
communicating an instruction from the application service to a proxy call session control function of the IMS core; and
blocking, by the proxy call session control function the user device from accessing the media resource function of the IMS core for a predetermined time period.

2. The method of claim 1, wherein the authentication failure type comprises a non-entry type, and an invalid timing type, wherein the non-entry type does not comprise an authentication code, and the invalid timing type comprises an average inter-digit entry time being less than a predetermined threshold.

3. The method of claim 2, further comprising determining a location of the user device.

4. The method of claim 3, further comprising determining the user device is a member of a set of user devices within a predetermined threshold distance, wherein each user device of the set of user devices has a common hacking category.

5. The method of claim 4, wherein the blocking comprises blocking all user devices within the predetermined threshold distance of the user device.

6. A system for mitigating impacts on restricted telecommunication services, the system comprising:
a node, the node configured to wirelessly communicate with a user device in a geographic service area; and
one or more processors configured to perform operations comprising:
receiving at a media resource function of an IMS core, a request from a user device to access a government emergency telecommunication service;
in response to receiving the request, prompting, by the media resource function, the user device for an authentication PIN;
receiving, from the user device, an authentication response;
determining an authentication failure type based of the authentication response;
determining an authentication failure frequency of the user device;
determining, by an application service of the IMS core, a hacking category of the user device based on the authentication failure type and the authentication failure;
communicating an instruction from the application service to a proxy call session control function of the IMS core; and
blocking, by the proxy call session control function the user device from accessing the media resource function of the IMS core for a predetermined time period.

7. The system of claim 6, wherein the authentication response comprises an alphanumeric input.

8. The system of claim 7, wherein the one or more processors are further configured to determine an average time between each digit of the alphanumeric input is less than a predetermined threshold.

9. The system of claim 8, wherein the one or more processors are further configured to determine an automatic number identifier (ANI) of the user device.

10. The system of claim 9, wherein the blocking comprises an expiration time, and wherein upon a conclusion of the expiration time, blocking is terminated.

11. The system of claim 6, wherein the authentication failure type comprises exceeding an authentication code entry time or an incorrect authentication code.

12. The system of claim 6, wherein the one or more processors are further configured to determine a location of the user device.

13. The system of claim 12, wherein the one or more processors are further configured to determine the user device is a member of a set of user devices within a predetermined threshold distance, wherein each user device of the set of user devices has a common authentication failure type.

14. The system of claim 13, wherein the one or more processors are further configured to determine the user device is a member of a set of user devices within a predetermined threshold distance, wherein each user device of the set of user devices has a common hacking category.

15. The system of claim 14, wherein the one or more processors are further configured to block, by the proxy call session control function, all user devices within the predetermined threshold distance of the user device.

16. The system of claim 6, wherein the restricted telecommunication service is the government emergency telecommunication service.

17. A non-transitory computer readable media, having instructions stored thereon, that, when executed by one or more processors, cause the one or more processors to carry out a method for mitigating hacking of a restricted telecommunication service, the method comprising:

receiving at a media resource function of an IMS core, a request from a user device to access a government emergency telecommunication service;

in response to receiving the request, prompting, by the media resource function, the user device for an authentication PIN;

receiving, from the user device, an authentication response;

determining an authentication failure type based of the authentication response;

determining an authentication failure frequency of the user device;

determining, by an application service of the IMS core, a hacking category of the user device based on the authentication failure type and the authentication failure;

communicating an instruction from the application service to a proxy call session control function of the IMS core; and blocking, by the proxy call session control function the user device from accessing the media resource function of the IMS core for a predetermined time period.

18. The non-transitory computer readable media of claim 17, wherein the authentication response comprises an alphanumeric input.

19. The non-transitory computer readable media of claim 17, wherein the one or more processors are further configured to determine an average time between each digit of the alphanumeric input is less than a predetermined threshold.

20. The non-transitory computer readable media of claim 17, wherein the blocking comprises an expiration time, and wherein upon a conclusion of the expiration time, blocking is terminated.

* * * * *